(12) United States Patent
Haugen et al.

(10) Patent No.: US 12,315,037 B2
(45) Date of Patent: May 27, 2025

(54) DATA TRANSPORT COMPRESSION AND REDUCTION BASED UPON INTRA-CONTENT USER FOCUS

(71) Applicant: AT&T Intellectual Property I, L.P., Atlanta, GA (US)

(72) Inventors: Lucus Haugen, Ponte Vedra Beach, FL (US); Jianlei Zhang, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 141 days.

(21) Appl. No.: 17/993,632

(22) Filed: Nov. 23, 2022

(65) Prior Publication Data

US 2024/0169598 A1    May 23, 2024

(51) Int. Cl.
G06F 3/00    (2006.01)
G06F 3/01    (2006.01)
G06T 11/00   (2006.01)
H04L 65/80   (2022.01)

(52) U.S. Cl.
CPC .............. *G06T 11/00* (2013.01); *G06F 3/012* (2013.01); *G06F 3/013* (2013.01); *H04L 65/80* (2013.01); *G06T 2210/36* (2013.01)

(58) Field of Classification Search
CPC .......... G06F 3/013; G06F 3/012; G06F 3/011; G06T 19/006; G06T 11/00; G06T 19/00; G06T 19/20; G06T 2210/08; G06T 2210/36; G06T 3/4092
See application file for complete search history.

(56) References Cited

U.S. PATENT DOCUMENTS

| | | | |
|---|---|---|---|
| 2021/0349528 A1* | 11/2021 | Son | G06F 3/013 |
| 2022/0269340 A1* | 8/2022 | Hirvonen | G02B 27/0093 |
| 2022/0303629 A1* | 9/2022 | Gilson | G06F 3/012 |
| 2023/0186537 A1* | 6/2023 | Wang | G06T 3/40 345/428 |

* cited by examiner

*Primary Examiner* — Hau H Nguyen
(74) *Attorney, Agent, or Firm* — Hartman & Citrin LLC

(57) ABSTRACT

Concepts and technologies disclosed herein are directed to data transport compression and reduction based upon intra-content user focus. In one aspect disclosed herein, a device, such as an extended reality ("XR") headset, can determine an intra-content focus area of a user viewing a display. The device can provide the intra-content focus area to a content server, which can determine a content portion associated with the intra-content focus area. The device can receive, from the content server, the content portion associated with the intra-content focus area. The device can present, via the display, the content portion to be viewed by the user. Moreover, the concepts and technologies disclosed herein can also take advantage of content pooling effects and save bandwidth for a population of users given a Pareto distribution of their viewing distribution.

20 Claims, 9 Drawing Sheets

DATA TRANSPORT COMPRESSION AND REDUCTION BASED UPON INTRA-CONTENT USER FOCUS

BACKGROUND

High quality streaming video, low latency online gaming, digital software distribution, and the like greatly increase the data demands placed on both wired and wireless Internet service providers ("ISPs"). As a result, ISPs must make tremendous infrastructure investments to satisfy these data and latency demands, while improving service distribution to ensure that all content is available to all users at any time and at an affordable price. The data burden placed on ISPs will only continue to increase as content becomes more complex, including more prevalent high resolution video options (e.g., 4K and above), cloud-based video game streaming, and immersive technologies such as virtual reality and augmented reality that all utilize massive amounts of data that must be delivered with low latency to provide a desirable and repeatable user experience.

SUMMARY

Concepts and technologies disclosed herein are directed to data transport compression and reduction based upon intra-content user focus. In one aspect disclosed herein, a device, such as an extended reality ("XR") headset, can determine an intra-content focus area of a user viewing a display. The device can provide the intra-content focus area to a content server, which can determine a content portion associated with the intra-content focus area. The device can receive, from the content server, the content portion associated with the intra-content focus area. The device can present, via the display, the content portion to be viewed by the user.

In some embodiments, the device can determine the intra-content focus area of the user viewing the display based upon tracking a head movement of the user. Additionally or alternatively, the device can determine the intra-content focus area of the user viewing the display based upon tracking an eye movement of one or both eyes of the user. In some embodiments, the device also can determine a field-of-view center of the eye(s) of the user. The content portion determined by the content server can include data within the field-of-view center of the eye of the user. The content portion can include additional data outside the field-of-view center of the eye of the user.

In some embodiments, the data within the field-of-view center of the eye of the user is rendered in a higher resolution than the additional data outside the field-of-view center of the eye of the user. In addition or alternatively, the data within the field-of-view center of the eye of the user is rendered in a higher percentage of a color space than the additional data outside the field-of-view center of the eye of the user. In addition or alternatively, the data within the field-of-view center of the eye of the user is presented in a higher refresh rate than the additional data outside the field-of-view center of the eye of the user.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Instead of a brute-force overbuild of communication networks to ensure massive data assets are available to all users as needed, ISPs can utilize more intelligent data transfers that include exactly what the end user wants and only when they want it, which, in turn, can greatly reduce the burden on ISPs. The concepts and technologies disclosed herein enable more efficient data transfer to users at low latency by identifying and delivering only the specific content of interest to the users at a given time. This is accomplished, in part, by tracking, inferring, and predicting the content a user is currently viewing and what content the user will next be viewing. Moreover, content delivered in accordance with the concepts and technologies disclosed herein is available without detriment to quality or the user experience by employing specific software, algorithms, methodologies, user devices, directed hardware and distribution networks tailored to the expected viewership/data usage demands across all audiences/users, scaling resources to align with expected demand within an immersive stream (e.g., virtual reality video content, gaming, and the like) or utilization of portions of a dataset (e.g., augmented reality), and employing real-time distribution network reallocation as demand shifts from inferred and forecasted audience viewing.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1A:
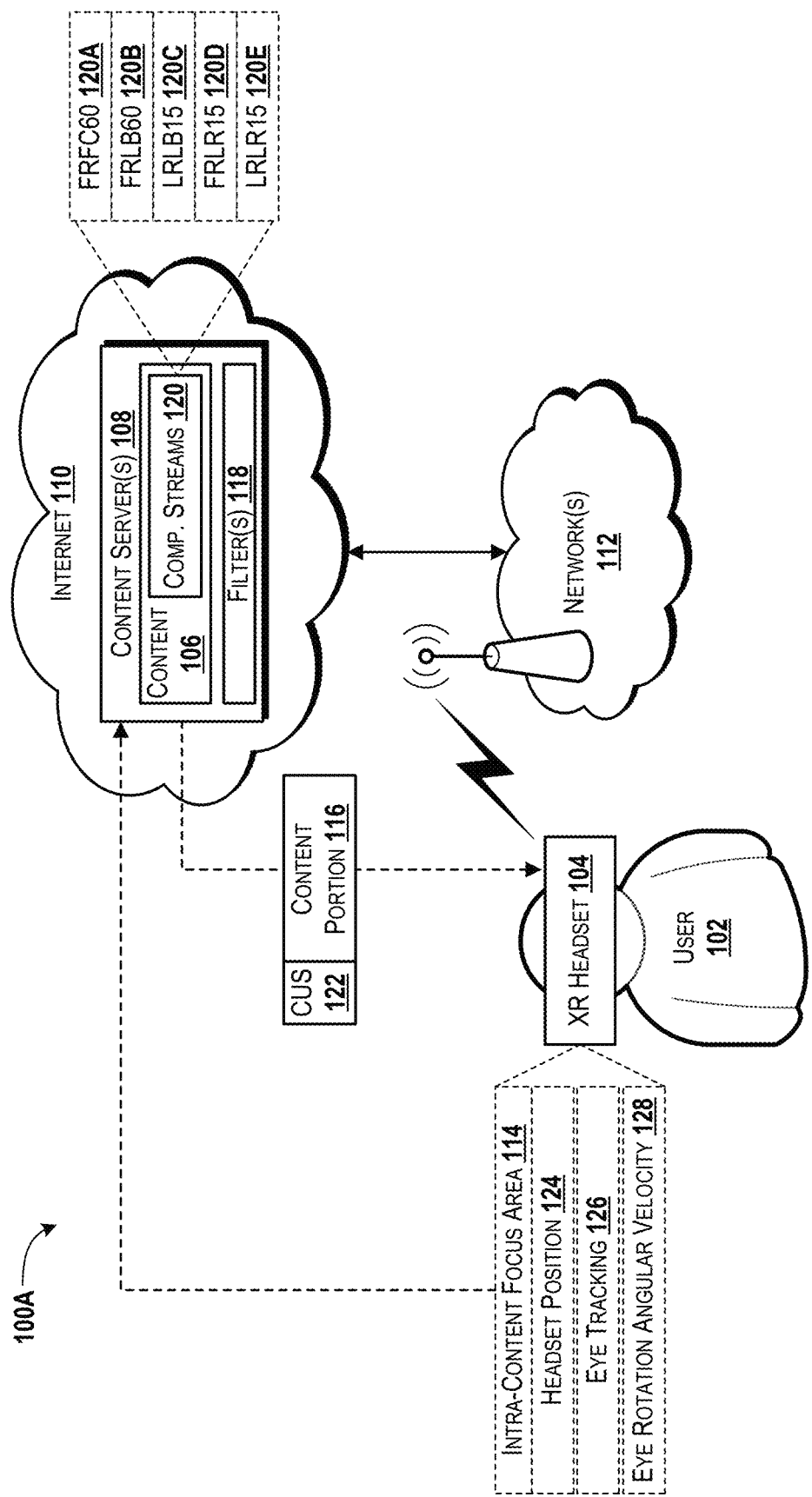
FIG. 1A is a block diagram illustrating aspects of an illustrative operating environment for implementing the various concepts and technologies disclosed herein.
Figure 1B:
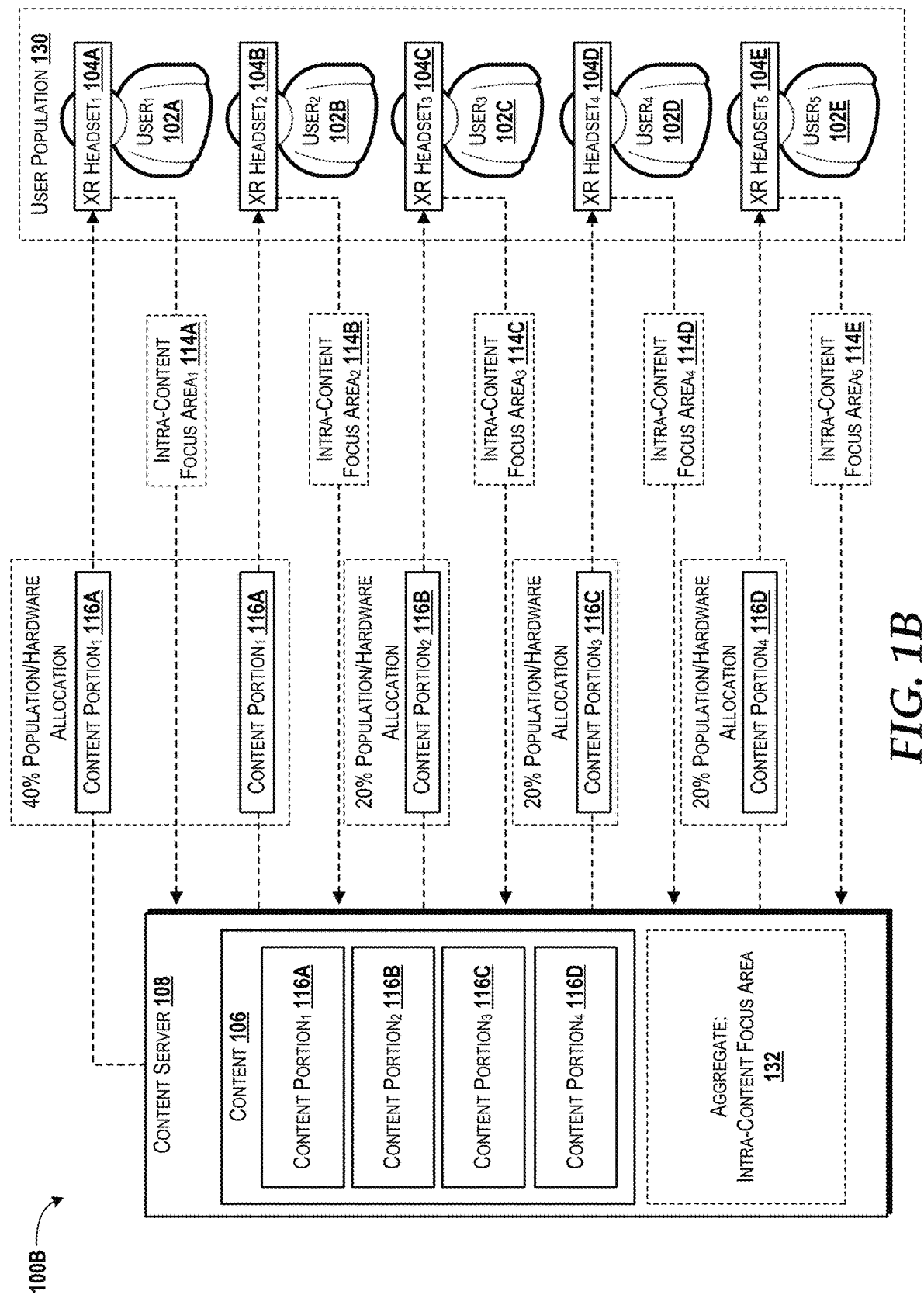
FIG. 1B is a block diagram illustrating aspects of another illustrative operating environment for implementing the various concepts and technologies disclosed herein.

While connections are shown between some of the components illustrated in the FIGS. 1A-1B, it should be understood that some, none, or all of the components illustrated in the FIGS. 1A-1B can be configured to interact with one another to carry out various functions described herein. Thus, it should be understood that the FIGS. 1A-1B and the following description are intended to provide a general understanding of a suitable environment in which various aspects of embodiments can be implemented, and should not be construed as being limiting in any way.

Referring now to FIG. 1A, aspects of an operating environment 100A for implementing various embodiments of the concepts and technologies disclosed herein will be described. The operating environment 100A includes a user 102 who is utilizing an extended reality ("XR") headset 104 to view content 106 served by a content server 108 over a connection to the Internet 110 via an access network 112. Although a single user 102 is shown in FIG. 1A, aspects of the concepts and technologies disclosed herein can be applied to multiple users 102, such as illustrated and described herein with reference to FIG. 1B. The XR headset 104 may be or may include an augmented reality ("AR") system, a virtual reality ("VR") system, or a mixed reality system (e.g., AR and VR components). The XR headset 104 will be described as a self-contained system, although the XR headset 104 alternatively or additionally may have connectivity to a separate device, such as a personal computer, to further enhance the capabilities of the XR headset 104 (e.g., improved graphics). The form factor, other design elements, hardware and software specifications, and other aspects of the XR headset 104 may vary depending upon the implementation. As such, the XR headset 104 is not limited to any particular XR headset that is currently available or that will be available in the future. Moreover, although a headset is described herein, aspects of the concepts and technologies disclosed herein can be applied to other devices such as smartphones, tablets, personal computers, smart devices, game systems, and the like.

In some embodiments, the XR headset 104 includes an AR system that can provide an augmented reality through which at least a portion of a physical, real-world environment is augmented to include one or more visualizations (not shown in the illustrated example). The visualizations can be presented over and/or spatially integrated with real-world objects of the physical, real-world environment. In some embodiments, the AR system can utilize a camera component to provide a live view of the physical, real-world environment to be augmented with the visualization(s). In other embodiments, the AR system can provide a non-live view of a physical, real-world environment. The non-live view can present a physical, real-world environment as a static image representative of a past reality that can be augmented with the visualization(s). As mentioned above, the XR headset 104 can be in communication with a separate device (e.g., a personal computer) via a wireless or wired connection through which data can be shared. More particularly, the XR headset 104 can function as a stand-alone system that utilizes on-board computing components to perform operations to present and facilitate manipulation of an augmented reality augmented with the visualization(s), or alternatively, can leverage the computing resources of a separate device, or even external cloud computing resources (e.g., as illustrated and described with reference to FIG. 7).

In some embodiments, the XR headset 104 includes a VR system that can provide a computer-generated environment (also referred to herein as a "virtual" environment) that the user 102 can explore. A VR environment can include a computer-generated representation or at least an approximation of at least a portion of a physical, real-world environment. The VR environment can be at least partially different from the physical, real-world environment of which the VR environment is representative. The VR environment can include virtual objects not found in the corresponding physical, real-world environment. The VR environment can be part of an interactive video, an interactive video game, or other immersive content. Graphics, lighting effects, and natural phenomena (e.g., gravity and momentum) can be simulated in the virtual environment.

Figure 6:
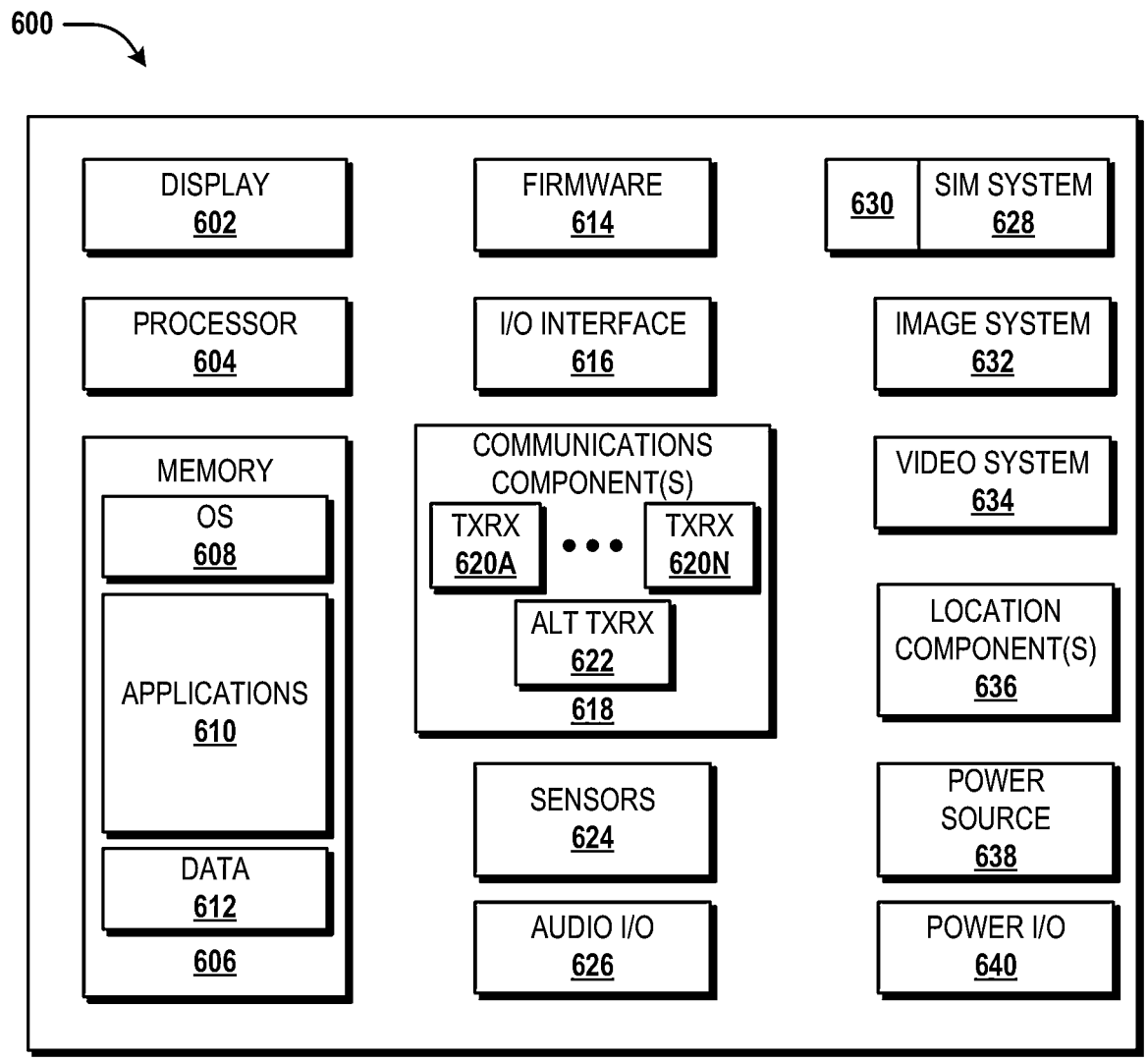
FIG. 6 is a block diagram illustrating an example mobile device and components thereof, according to an illustrative embodiment.

The XR headset 104 can include various components, such as a camera (e.g., a still camera and/or video camera; best shown in FIG. 6), one or more sensors (e.g., an accelerometer, a global positioning system sensor, a solid state compass, or the like; also best shown in FIG. 6), a display (e.g., an integrated display, a head-mounted display, an eyeglasses display, a head-up display, an external monitor, a projection system, or a holographic display; best shown in FIG. 6), an input device (best shown in FIG. 4), the like, or any combination thereof. In some embodiments, the XR headset 104 can be an AR device such as GOOGLE GLASS, available from GOOGLE INC., or MICROSOFT HOLOLENS, available from MICROSOFT CORP. In other embodiments, the XR headset 104 can be a VR device such as META QUEST (available from META), HTC VIVE (available from HTC), PLAYSTATION VR (available from SONY), or the like. The XR headset 104 is not limited to any particular AR, VR, or mixed reality device.

The XR headset 104 can provide an immersive viewing experience for the user 102 to experience the content 106. The content 106 can include any visual content, such as, but not limited to, still images, video, interactive video, video games, or some combination thereof. The content 106 can be formatted in a format suitable for playback via the XR headset 104. The content 106 may have any aspect ratio, some examples of which include 4:3, 16:9, 21:9, and 2:1 (e.g., for 360-degree video). The content 106 may have any resolution, which may be variable as will be described in greater detail herein. The content 106 may have any framerate, which also may be variable as will be described in greater detail herein. The content 106 may be presented using any percentage of a known color space (e.g., sRGB). The percentage also may be variable as will be described in greater detail herein. The content 106 will be described herein as video, and more particularly, streaming video served by the content server 108. This example should not be construed as being limiting in any way.

The user 102 has a visual field-of-view that represents what the user 102 sees. A normal visual field-of-view is a visible area approximately 90 degrees temporally to central fixation, 50 degrees superiorly and nasally, and 60 degrees inferiorly. The user 102 may have a better or worse visual field-of-view. Due to several physiological aspects of the human eye, the user 102 can only view, in focus, one portion of the visual field-of-view at a time. As the user 102 moves his eyes to focus on different portions of the visual field-of-view, other portions become out of focus. When viewing a video, such as the content 106, the user 102 naturally focuses on the objects that are represented in focus. For example, a videographer will likely focus on an actor in a movie scene and allow other objects within a scene to be out of focus. When viewing this movie scene, the user 102 naturally focuses on the actor and does not focus on the objects that are out of focus. However, the user 102 may shift focus to view other objects within the scene regardless of what the videographer intended to be the focus. The focus of the user 102 on a specific area of a display of the XR headset 104 is referred to herein as an "intra-content focus area 114." As the user 102 focuses on different portions of the display of the XR headset 104, the intra-content focus area 114 of the user 102 changes. As a result, the user 102 cannot view, in focus, the entirety of any content 106 that is presented on the display. Since the user 102 can only view a portion of the content 106 at any given time, the network bandwidth utilized to provide the content 106 is mostly wasted. In an effort to conserve network bandwidth, the content server 108 can utilize the intra-content focus area 114, received from the XR headset 104, to determine a content portion 116 that resides within the intra-content focus area 114 when the content portion 116 is presented on the display of the XR headset 104. In this manner, network bandwidth that would have been used to transmit the entirety of the content 106 is reduced to only what is needed to transmit the content portion 116.

The XR headset 104 can determine the intra-content focus area 114 based upon head (or hand in case of a handheld device) movements of the user 102. This is particularly useful for content 106 such as 360-degree video. When viewing a 360-degree video, the user 102 is more likely to move his head more often to experience the content 106 that is presented 360-degrees around the user 102. The XR headset 104 alternatively or additionally can determine the intra-content focus area 114 based upon eye movement. Eye movement can provide a finer granularity and understanding of area of focus within a visual field-of-view than head movement alone.

In a 360-degree video (or other immersive content), the user 102 may have, through the XR headset 104, a field-of-view of approximately 120 degrees. Based on a field-of-view of 120 degrees, by transmitting only the content portion 116 instead of the entirety of the content 106, the network bandwidth reduction could be approximately 66% for only horizontal rotational content (i.e., streaming only 33% of the viewable content per user at a time), and 83% bandwidth reduction for vertical and horizontal rotational content (i.e., streaming only 17% of the viewable content per user at a time).

Within a 120 degree field-of-view, the visual acuity among users 102 will vary. Specifically, the area around the fovea is the highest visual acuity and diminishes from the foveal center. In some embodiments, the content server 108 can apply one or more filters 118 that utilize this visual acuity distribution. For example, the filter(s) 118 can compress data beyond approximately 70 degrees from the foveal center of each eye. In other words, only the content portion 116 around the normal hill of vision for the user 102 is streamed in full resolution. As the user 102 directs focus on other areas of the content 106, the stream resolution can shift around the normal hill of vision. For any given user 102, only a portion of the 120-degree full visual field-of-view of the content 106 is streamed in full resolution and the remaining can be halved. For example, an ultra-high definition ("UHD") video streams natively in 2160p (4096 by 2160 pixels) is only streamed in 2160p within 70 degrees from the field-of-view center of each of the user's 102 eyes, and is streamed in 1080p (2048 by 1080 pixels) outside of 70 degrees.

In addition to visual acuity decreasing in the field-of-view further away from the fovea, the user's 102 color perception diminishes. That is, based on the composition of rods and cones in the eyes, sensitivities to certain colors vary. Cones make up the fovea center of the eye and more readily differentiate between colors. There are approximately 6 to 7 million cones that can be divided into "red" cones (64%), "green" cones (32%), and "blue" cones (2%) in the typical human eye. The cones provide the eye's color sensitivity. The green and red cones are concentrated in the fovea center. The "blue" cones have the highest sensitivity and are mostly found outside the fovea, leading to some distinctions in the eye's blue perception. Rods do not see red and are most dense away from the fovea center. The light response of the rods peaks sharply in the blue, and responds very little to red light. Given the center of focus is least sensitive to blue, and outside of that center red is not required, the filter(s) 118 can reduce these colors, further reducing the bandwidth necessary to provide the content 106 to the XR headset 104.

Similar to resolution and color, the flicker rate sensitivity of the eye also diminishes further away from the fovea. Lowering the refresh rates within certain portions of the visible area will further reduce the bandwidth requirement. As cones are more sensitive to higher refresh rates than rods, the further from the foveal center the lower the need for higher frequency refresh rates. As such, the filter(s) 118 can be tuned to trail off refresh rates from up to 60 Hz for full quality content at the foveal center down to 15 Hz at 20 degrees from the foveal center. The framerate in which the content 106 is rendered may also be reduced to match the refresh rate and further reduce the bandwidth requirement.

An additional compression opportunity is through speed of motion within the content 106 stream and necessary eye rotation to track the content 106. Through a phenomenon known as saccadic masking, the brain selectively blocks visual processing during rapid eye movements such that the blur of motion is removed, and the gap of missing content is not perceived by the user 102. As the eye moves quickly across the viewable area, the user's 102 pupils are tracked for a given angular velocity triggering the filter(s) 118 to reduce the data refresh rate to 15 Hz for 30 degrees per second or greater movement. So long as the angular velocity exceeds this threshold, the data resolution is reduced to lower pixel resolution and lower refresh rate (e.g., 15 Hz).

Using the physiological properties of the human eye described above, the content server 108 can create, using the filters 118, five constituent component streams 120 (shown collectively as "component streams 120"). A full resolution/full color/60 Hz ("FRFC60") stream 120A can be provided as the base stream that is used as the basis for filtering the remaining streams. If the native stream (i.e., unfiltered stream) is above 60 Hz, the filters 118 can reduce the stream to 60 Hz for the FRFC60 stream 120A. A full resolution/limited blue/60 Hz ("FRLB60") stream 120B can be used for foveal focus of each eye with low velocity angular rotation and within 20 degrees of the foveal focus. A lower resolution/limited blue/15 Hz ("LRLB15") stream 120C can be used for foveal focus of each eye with high rotational velocity, high velocity angular rotation with lower resolution and refresh rate, within 20 degrees of the foveal focus, and optimized for cone concentration. A full resolution/limited red/15 Hz ("FRLR15") stream 120D can be used for extra-foveal focus of each eye with low velocity angular rotation, from 20 to 70 degrees away from the foveal focus, and optimized for rod concentration. A lower resolution/limited red/16 Hz ("LRLR15") stream 120E can be used for extra-foveal focus of each eye with high velocity angular rotation and with lower resolution and refresh rate (e.g., from 20 to 70 degrees away from the foveal focus), low and high velocity angular rotation with lower resolution and refresh rate (70 degrees or more away from the foveal focus), and optimized for rod concentration.

Depending upon the head and/or eye position for the user 102, a personalized composite user stream ("CUS") 122 can be created. The CUS 122 can include a combination of three of the constituent component streams 120. For example, the CUS 122 can include a combination of (1) the FRLB60 stream 120B or the LRLB15 stream 120C depending on rotational velocity and up to 20 degrees from the foveal center of each eye; (2) the FRLR15 stream 120D or the LRLR15 stream 120E depending on rotational velocity and from 20 to 70 degrees from the foveal center of each eye; and (3) LRLR15 120E for low and high rotational velocity and beyond 70 degrees from the foveal center of each eye. The CUS 122 includes only the content portion 116 that is in view and accounts for the physiological limitations of the human eye and brain.

The content server 108 can determine the CUS 122 for each individual user 102. The complete visual field-of-view of the user 102 can be jointly determined by combining headset tracking and eye tracking, which determines the position of the user's 102 eyes with relative angular position and angular velocity of the XR headset 104. The visual field-of-view beyond the foveal focus (i.e., 20 degrees from center) can utilize headset position tracking. The CUS 122 can be constructed and provided based upon the positions of the head and the eyes of the user 102. Each of the user's 102 eyes views a separate CUS 122 comprised of three of the constituent component streams 120 described above given a specific headset position 124, eye tracking 126, and eye rotation angular velocity 128.

For pre-recorded or on-demand types of content 106, data from the intra-content focus area 114 and the CUS 122 of multiple users 102 can be aggregated and used to model a heatmap of focal demand within the content 106. For live VR video or VR gaming, modeling can be used to predict the distribution demand. Ultimately, the user population viewing a single content stream will have portions of that population viewing the same general content (e.g., the same content portion 116) in a predictable and distributed way, which may resemble a Pareto distribution. Using Pareto optimization for bandwidth assignment in consideration of a typical viewing area of 120 degrees per user, the higher percentage of the user population with a viewing focus on a common area results in more bandwidth saving in a given stream. Conversely, if all of the viewers focus across the complete content, then there are no bandwidth savings.

Turning now to FIG. 1B, a block diagram of another operating environment 100B in which an example Pareto optimization for network distribution is illustrated will be described, according to an illustrative embodiment. In the illustrated example, a user population 130 includes a user$_1$ 102A associated with an XR headset$_1$ 104A through which the user$_1$ 102A is viewing an intra-content focus area$_1$ 114A, a user$_2$ 102B associated with an XR headset$_2$ 104B through which the user$_2$ 102B is viewing an intra-content focus area$_2$ 114B, a user$_3$ 102C associated with an XR headset$_3$ 104C through which the user$_3$ 102C is viewing an intra-content focus area$_3$ 114C, a user$_4$ 102D associated with an XR headset$_4$ 104D through which the user$_4$ 102D is viewing an intra-content focus area$_4$ 114D, and a users 102E associated with an XR headset$_5$ 104E through which the users 102E is viewing an intra-content focus areas 114E. Although five users and associated XR headsets 104 are illustrated in FIG. 1B, in practice, the user population 130 may include hundreds or thousands of users 102 and associated XR headsets 104. As such, the illustrated example should be construed as exemplary only and not limiting in any way.

Each of the XR headset$_{1-5}$ 104A-104E provides the corresponding intra-content focus area$_{1-5}$ 114A-114E to the content server 108. The content server 108 can create an aggregate of the intra-content focus areas 132 and determine the appropriate content portion(s) 116 to be sent to each of the XR headsets 104A-104E. In the illustrated example, the content server 108 determines, based upon the aggregate of the intra-content focus areas 132, that the users$_{1-2}$ 102A, 102B or 40% of the user population 130 are viewing an area that is suitable for a content portion$_1$ 116A, the user$_3$ or 20% of the user population 130 is viewing an area that is suitable for a content portion 116B, the user$_4$ or 20% of the user population 130 is viewing an area that is suitable for a content portion$_3$ 116C, and the users or 20% of the user population 130 is viewing an area that is suitable for a content portion$_4$ 116D. Resources of the content server 108, the network(s) 112, and/or other components that provide, at least in part, the content 106 to the XR headset 104 can be allocated based upon the same percentage as the user population 130. For example, 40% of the resources can be allocated to provide the content portion$_1$ 116A to the XR headsets$_{1-2}$ 104A, 104B associated with the users$_{1-2}$ 102A, 102B.

By pooling the content portions 116 for all users 102 who share the same data transmission route/cable, a video frame and amplifier bandwidth of the content portion 116 can be divided according to the number of users 102 that view the content portion 116 at current time interval. Given that the data rate reduction in terms of the resolution, color palette, and refresh rate are different for each of the content portions 116A-116D in accordance with the Pareto optimization, one extreme is that all users 102 view same content portion 116, which saves the most bandwidth during transmission, and another extreme is that all users 102 view the content portion 116 evenly distributed across the whole area of the video. Thus, an algorithm can be used to calculate the data reduction (or an estimated data reduction) during the transmission by considering the viewing behavior of the users 102 and to generate the distribution of content 106 to the users 102.

Figure 2:
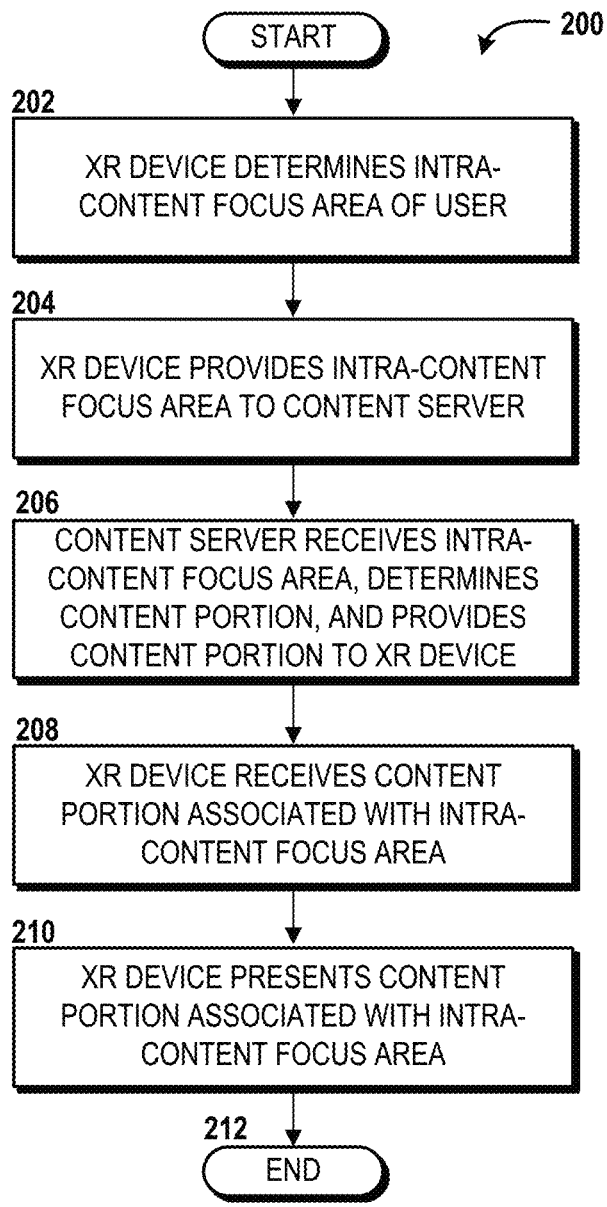
FIG. 2 is a flow diagram illustrating aspects of a method for data transport compression and reduction based upon an intra-content user focus, according to an illustrative embodiment.

Turning now to FIG. 2, aspects of a method 200 for data transport compression and reduction based upon the intra-content focus area 114 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the XR headset 104, the content server(s) 108, and/or a processor one or more other computing systems and/or devices disclosed herein to perform operations.

For purposes of illustrating and describing some of the concepts of the present disclosure, the methods disclosed herein are described as being performed via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the XR headset 104 determines the intra-content focus area 114 of the user 102. In some embodiments, the XR headset 104 uses various sensors (e.g., gyroscope, accelerometer, cameras, combinations thereof, and/or the like) to track the head movement of the user 102. The XR headset 104 is illustrated and described as a self-contained device that is capable of self-tracking, but other implementations may utilize external sensors/devices to provide tracking data back to the XR headset 104 for making the determination at operation 202. In some embodiments, the XR headset 104 implements one or more eye-tracking technologies that utilize various sensors (e.g., infrared or near-infrared) to determine a fixation (i.e., when the eye gaze pauses at a certain position) and saccades (i.e., when the eye moves to another position) to track the eye movement of one or both eyes of the user 102. Although head tracking may be used alone, the use of additional eye tracking can greatly enhance the granularity and understanding of what the user 102 is focused on within a visual field-of-view. The XR headset 104 can implement any type of head tracking and/or eye tracking, and as such, the examples provided herein are merely exemplary and should not be construed as being limiting in any way. As part of the determination at operation 202, the XR headset 104 can use head tracking and/or eye tracking to determine a field-of-view center (also referred to herein as the "foveal center"). Within a typical 120 degree field-of-view, the visual acuity among users 102 will vary. Specifically, the area around the fovea is the highest visual acuity and diminishes from the foveal center.

From operation 202, the method 200 proceeds to operation 204. At operation 204, the XR headset 104 provides the intra-content focus area 114 to the content server 108. From operation 204, the method 200 proceeds to operation 206. At operation 206, the content server 108 receives the intra-content focus area 114 from the XR headset 104 and determines the content portion 116 associated with the intra-content focus area 114. In some embodiments, the content server 108 can provide the content portion 116 to the XR headset 104 in full resolution (e.g., HD or UHD). The content server 108 additionally can provide the content 106 outside of the content portion 116 at a lower resolution, reduced color space, and/or a reduced refresh rate. Additional details in this regard will be described herein with reference to FIG. 3.

From operation 206, the method 200 proceeds to operation 208. At operation 208, the XR headset 104 receives the content portion 116 associated with the intra-content focus area 114. From operation 208, the method 200 proceeds to operation 210. At operation 210, the XR headset 104 presents the content portion 116 to the user 102. As noted above, in addition to the content portion 116, the XR headset 104 also can receive additional content 106 outside of the content portion 116. Depending upon the needs of a given implementation, only the content portion 116 may be presented (e.g., for maximum bandwidth conservation) or the content portion 116 can be accompanied by additional content 106 outside of the content portion 116. The additional content 106 can be in a different resolution, color space, and/or refresh rate. Additional details in this regard will be described herein with reference to FIG. 3.

From operation 210, the method 200 proceeds to operation 212. The method 200 can end at operation 212.

Figure 3:
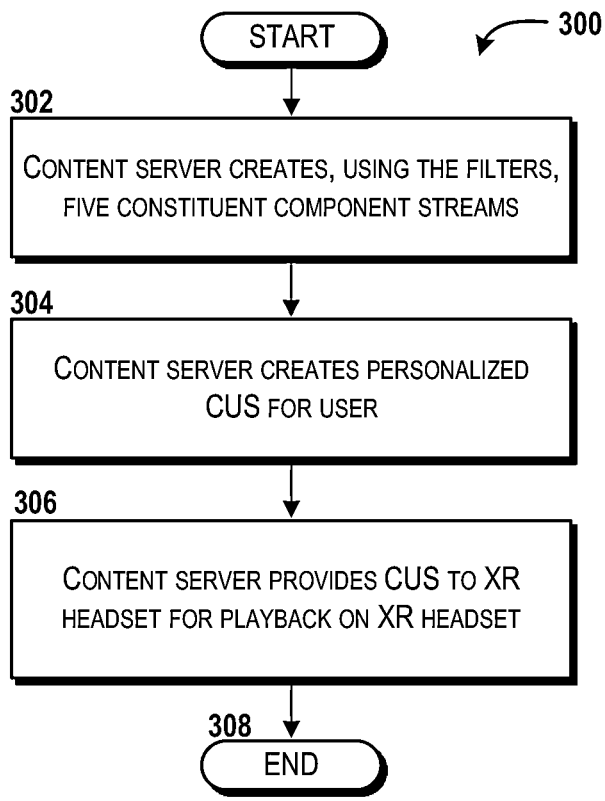
FIG. 3 is a flow diagram illustrating aspects of another method for data transport compression and reduction based upon intra-content user focus, according to an illustrative embodiment.

Turning now to FIG. 3, another method 300 for data transport compression and reduction based upon the intra-content focus area 114 will be described, according to an illustrative embodiment. The method 300 begins and proceeds to operation 302. At operation 302, the content server 108 creates, using the filters 118, the five constituent component streams 120. In particular, the content server 108 can create the full resolution/full color/60 Hz ("FRFC60") stream 120A, which can be provided as the base stream that is used as the basis for filtering the remaining streams. If the native stream (i.e., unfiltered stream) is above 60 Hz, the filters 118 can reduce the stream to 60 Hz for the FRFC60 stream 120A. The content server 108 can create the full resolution/limited blue/60 Hz ("FRLB60") stream 120B, which can be used for foveal focus of each eye with low velocity angular rotation and within 20 degrees of the foveal focus. The lower resolution/limited blue/15 Hz ("LRLB15") stream 120C can be used for foveal focus of each eye with high rotational velocity, high velocity angular rotation with lower resolution and refresh rate, within 20 degrees of the foveal focus, and optimized for cone concentration. The full resolution/limited red/15 Hz ("FRLR15") stream 120D can be used for extra-foveal focus of each eye with low velocity angular rotation, from 20 to 70 degrees away from the foveal focus, and optimized for rod concentration. The lower resolution/limited red/16 Hz ("LRLR15") stream 120E can be used for extra-foveal focus of each eye with high velocity angular rotation and with lower resolution and refresh rate (e.g., from 20 to 70 degrees away from the foveal focus), low and high velocity angular rotation with lower resolution and refresh rate (70 degrees or more away from the foveal focus), and optimized for rod concentration.

From operation 302, the method 300 proceeds to operation 304. At operation 304, the content server 108 creates a personalized CUS 122 for the user 102. The content server 108 can create the CUS 122 based upon the head and/or eye position of the user 102. The CUS 122 can include a combination of three of the constituent component streams 120. For example, the CUS 122 can include a combination of (1) the FRLB60 stream 120B or the LRLB15 stream 120C depending on rotational velocity and up to 20 degrees from the foveal center of each eye; (2) the FRLR15 stream 120D or the LRLR15 stream 120E depending on rotational velocity and from 20 to 70 degrees from the foveal center of each eye; and (3) LRLR15 120E for low and high rotational velocity and beyond 70 degrees from the foveal center of each eye. The CUS 122 includes only the content portion 116 that is in view and accounts for the physiological limitations of the human eye and brain. The content server 108 can determine the CUS 122 for each individual user 102. The complete visual field-of-view of the user 102 can be jointly determined by combining headset tracking and eye tracking, which determines the position of the user's 102 eyes with relative angular position and angular velocity of the XR headset 104. The visual field-of-view beyond the foveal focus (i.e., 20 degrees from center) can utilize headset position tracking. The CUS 122 can be constructed and provided based upon the positions of the head and the eyes of the user 102. Each of the user's 102 eyes views a separate CUS 122 comprised of the three of the constituent component streams 120 described above given the specific headset position 124, the eye tracking 126, and the eye rotation angular velocity 128.

From operation 304, the method 300 proceeds to operation 306. At operation 306, the content server 108 provides the CUS 122 to the XR headset 104 for playback on the XR headset 104.

From operation 306, the method 300 proceeds to operation 308. The method 300 can end at operation 308.

Figure 4:
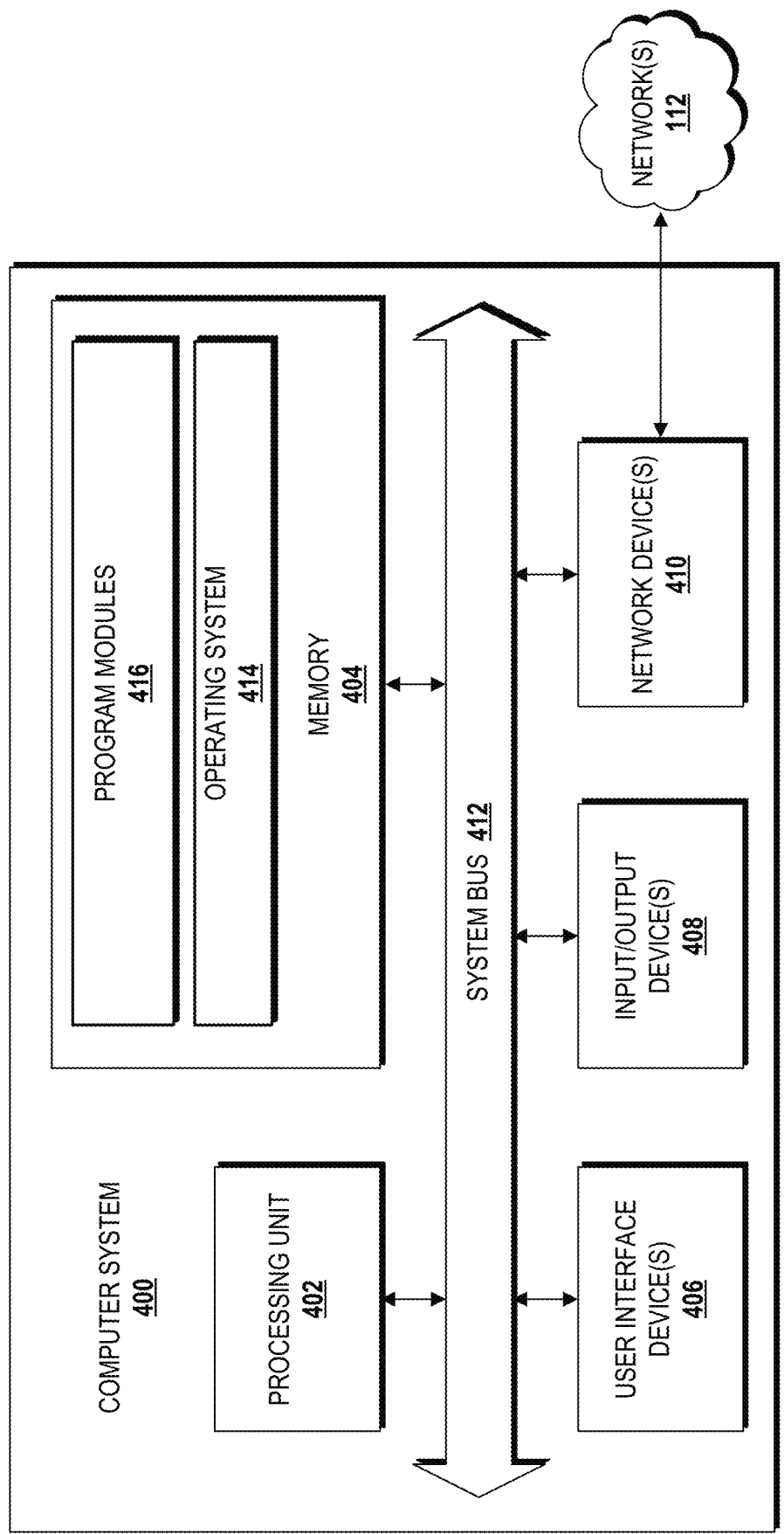
FIG. 4 is a block diagram illustrating an example computer system capable of implementing aspects of the concepts and technologies disclosed herein.

Turning now to FIG. 4, a block diagram illustrating a computer system 400 configured to provide the functionality in accordance with various embodiments of the concepts and technologies disclosed herein. In some implementations, the content server 108, the XR headset 104, and/or other systems described herein can be configured, at least in part, like the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416.

The operating system 414 can include, but is not limited to, members of the WINDOWS family of operating systems from MICROSOFT CORPORATION, the LINUX family of operating systems, the MAC OS, OS X, and/or iOS families of operating systems from APPLE CORPORATION, proprietary operating system, and/or the like. The program modules 416 may include various software and/or program modules to perform the various operations described herein. For example, the program modules can include the filters 118 best shown in FIG. 1A. The program modules 416 and/or other programs can be embodied in computer-readable media containing instructions that, when executed by the processing unit 402, perform various operations such as those described herein. According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, the XR headset 104, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems, such as the content server(s) 108, via the network(s) 112. Examples of the network devices 410 include, but are not limited to, a modem, a radio frequency ("RF") or infrared ("IR") transceiver, a telephonic interface, a bridge, a router, or a network card. The network 112 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 112 may be a wired network such as, but not limited to, a wide area network ("WAN"), a wired LAN such as provided via Ethernet, a wired personal area network ("PAN"), or a wired metropolitan area network ("MAN").

Figure 5:
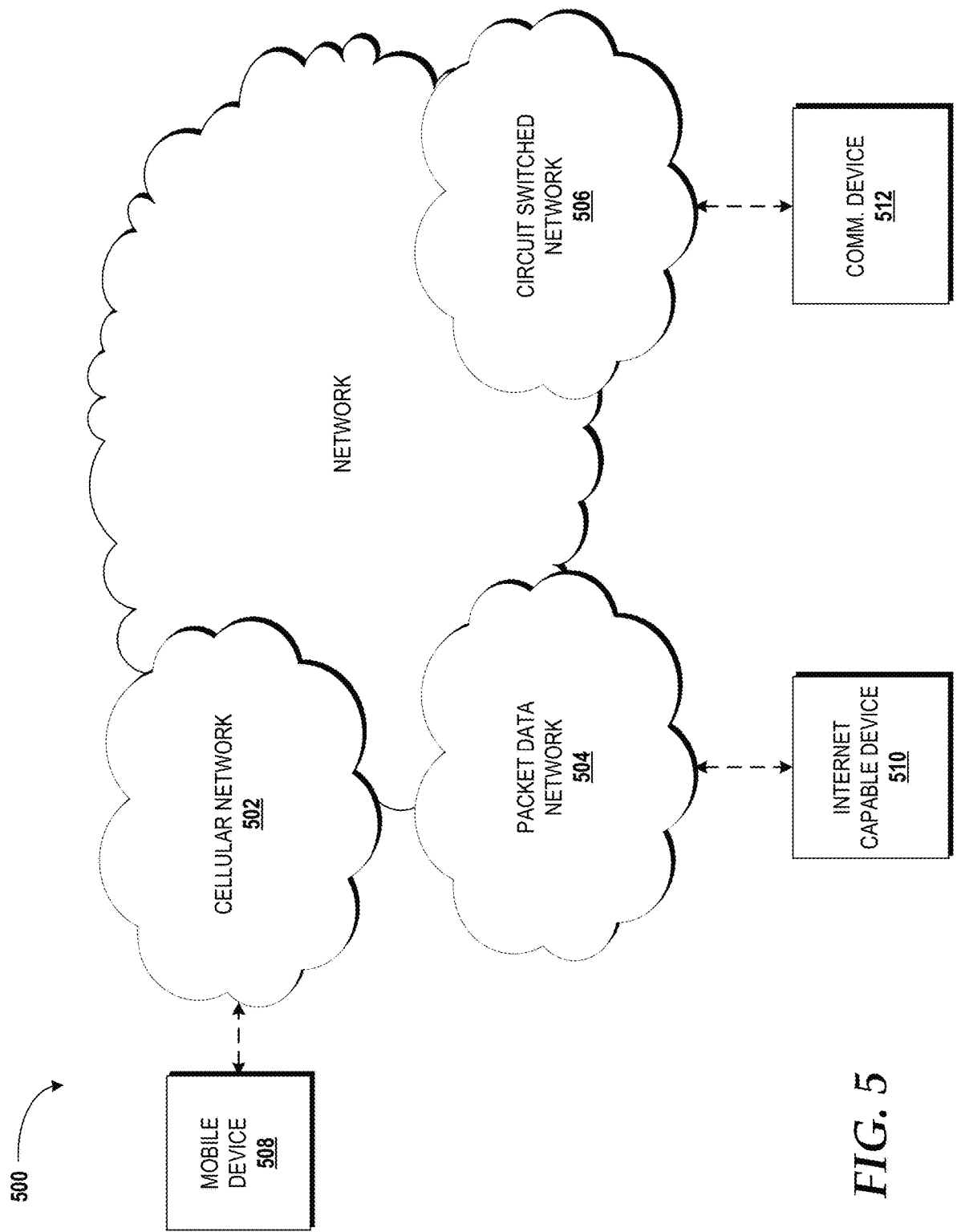
FIG. 5 schematically illustrates a network, according to an illustrative embodiment.

Turning now to FIG. 5, additional details of a network 500, such as the network(s) 112, are illustrated, according to an illustrative embodiment. The network 500 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 502 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 502 also is compatible with 4G mobile communications standards such as Long-Term Evolution ("LTE"), 5G mobile communications standards, or the like, as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, the XR headset 104, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 500 is used to refer broadly to any combination of the networks 502, 504, 506. It should be appreciated that substantially all of the functionality described with reference to the network 500 can be performed by the cellular network 502, the packet data network 504, and/or the circuit switched network 506, alone or in combination with other networks, network elements, and the like.

Turning now to FIG. 6, an illustrative mobile device 600 and components thereof will be described. In some embodiments, the XR headset 104 can be configured as and/or can have an architecture similar or identical to the mobile device 600 described herein in FIG. 6. It should be understood, however, that the XR headset 104 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display the content 106, the content portion 116, the CUS 122, various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user, such as the user 102, in viewing and interacting with the content 106, the content portion 116, the CUS 122, entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600.

According to various embodiments, the applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with the network(s) 112 described above herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, code division multiple access ("CDMA"), CDMAONE, CDMA2000, LTE, and various other 2G, 2.5G, 3G, 4G, 5G, and greater generation technology standards. Moreover, the communications component 618 may facilitate communications over various channel access methods (which may or may not be used by the aforementioned standards) including, but not limited to, time division multiple access ("TDMA"), frequency division multiple access ("FDMA"), wideband CDMA ("W-CDMA"), orthogonal frequency-division multiplexing ("OFDM"), spatial division multiple access ("SDMA"), and the like.

In addition, the communications component 618 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to a multimedia message service ("MIMS") message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from GPS devices, A-GPS devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
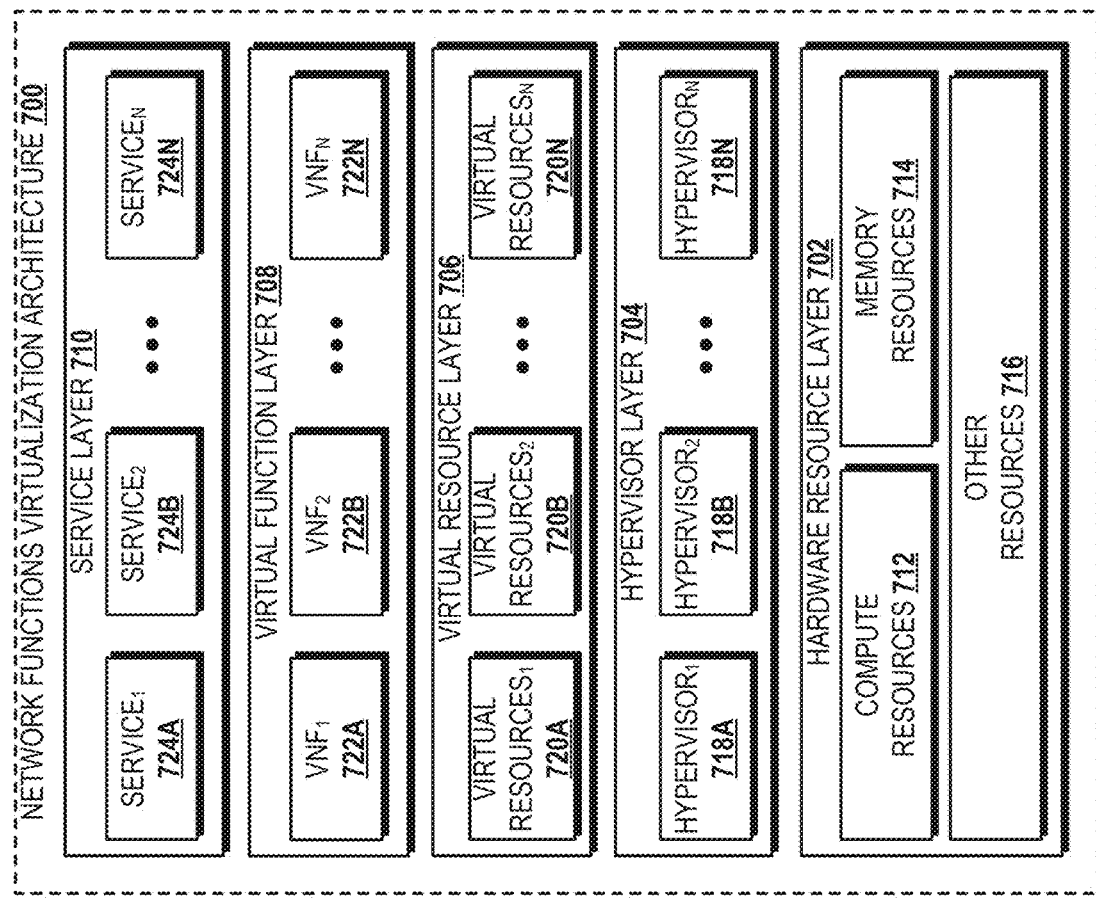
FIG. 7 is a block diagram illustrating an example network functions virtualization architecture capable of implementing aspects of the concepts and technologies presented herein.

Turning now to FIG. 7, a block diagram illustrating an example NFV architecture 700 and components thereof will be described, according to an exemplary embodiment. The NFV architecture 700 can be utilized to implement various elements disclosed herein. For example, the NFV architecture 700 can be implement the content server(s) 108 and/or aspects of the network(s) 112.

The NFV architecture 700 includes a hardware resource layer 702, a hypervisor layer 704, a virtual resource layer 706, a virtual function layer 708, and a service layer 710. While no connections are shown between the layers illustrated in FIG. 7, it should be understood that some, none, or all of the components illustrated in FIG. 7 can be configured to interact with one other to carry out various functions described herein. In some embodiments, the components are arranged so as to communicate via one or more networks. Thus, it should be understood that FIG. 7 and the remaining description are intended to provide a general understanding of a suitable environment in which various aspects of the embodiments described herein can be implemented and should not be construed as being limiting in any way.

The hardware resource layer 702 provides hardware resources. In the illustrated embodiment, the hardware resource layer 702 includes one or more compute resources 712, one or more memory resources 714, and one or more other resources 716. The compute resource(s) 712 can include one or more hardware components that perform computations to process data and/or to execute computer-executable instructions of one or more application programs, one or more operating systems, and/or other software. In particular, the compute resources 712 can include one or more central processing units ("CPUs") configured with one or more processing cores. The compute resources 712 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 712 can include one or more discrete GPUs. In some other embodiments, the compute resources 712 can include CPU and GPU components that are configured in accordance with a co-processing CPU/GPU computing model, wherein the sequential part of an application executes on the CPU and the computationally-intensive part is accelerated by the GPU processing capabilities. The compute resources 712 can include one or more system-on-chip ("SoC") components along with one or more other components, including, for example, one or more of the memory resources 714, and/or one or more of the other resources 716. In some embodiments, the compute resources 712 can be or can include one or more SNAPDRAGON SoCs, available from QUALCOMM of San Diego, California; one or more TEGRA SoCs, available from NVIDIA of Santa Clara, California; one or more HUMMINGBIRD SoCs, available from SAMSUNG of Seoul, South Korea; one or more Open Multimedia Application Platform ("OMAP") SoCs, available from TEXAS INSTRUMENTS of Dallas, Texas; one or more customized versions of any of the above SoCs; and/or one or more proprietary SoCs. The compute resources 712 can be or can include one or more hardware components architected in accordance with an ARM architecture, available for license from ARM HOLDINGS of Cambridge, United Kingdom. Alternatively, the compute resources 712 can be or can include one or more hardware components architected in accordance with an x86 architecture, such an architecture available from INTEL CORPORATION of Mountain View, California, and others. Those skilled in the art will appreciate the implementation of the compute resources 712 can utilize various computation architectures, and as such, the compute resources 712 should not be construed as being limited to any particular computation architecture or combination of computation architectures, including those explicitly disclosed herein.

The memory resource(s) 714 can include one or more hardware components that perform storage/memory operations, including temporary or permanent storage operations. In some embodiments, the memory resource(s) 714 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 712.

The other resource(s) 716 can include any other hardware resources that can be utilized by the compute resources(s) 712 and/or the memory resource(s) 714 to perform operations described herein. The other resource(s) 716 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more hypervisors 718A-718N (also known as "virtual machine monitors") operating within the hypervisor layer 704 to create virtual resources that reside in the virtual resource layer 706. The hypervisors 718A-718N can be or can include software, firmware, and/or hardware that alone or in combination with other software, firmware, and/or hardware, creates and manages virtual resources 720A-720N operating within the virtual resource layer 706.

The virtual resources 720A-720N operating within the virtual resource layer 1406 can include abstractions of at least a portion of the compute resources 712, the memory resources 714, and/or the other resources 716, or any combination thereof. In some embodiments, the abstractions can include one or more VMs, virtual volumes, virtual networks, and/or other virtualized resources upon which one or more VNFs 722A-722N. The VNFs 722A-722N in the virtual function layer 708 are constructed out of the virtual resources 720A-720N in the virtual resource layer 706. In the illustrated example, the VNFs 722A-722N can provide, at least in part, one or more services 724A-724N, such as telecommunications services, in the service layer 710.

Figure 8:
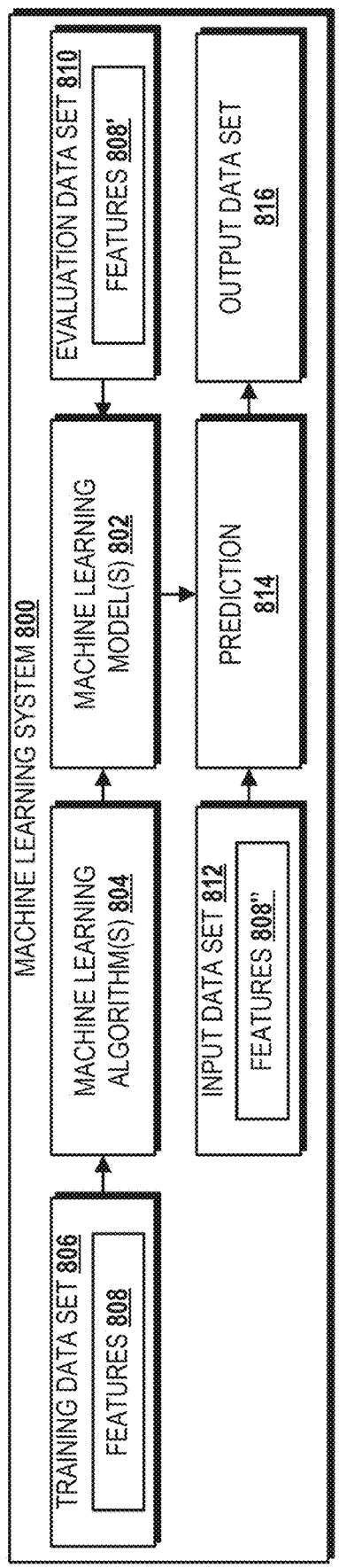
FIG. 8 is a block diagram illustrating an illustrative machine learning system capable of implementing aspects of the concepts and technologies disclosed herein.

Turning now to FIG. 8, a machine learning system 800 capable of implementing aspects of the embodiments disclosed herein will be described. In some embodiments, the content server(s) 108 can be configured to include or to utilize the machine learning system 800 to create the content portion 116, to create the composition streams 120, to implement the filter(s) 118, to create the CUS 122, and/or other operations disclosed herein. The illustrated machine learning system 800 includes one or more machine learning models 802. The machine learning models 802 can include supervised and/or semi-supervised learning models. The machine learning model(s) 802 can be created by the machine learning system 800 based upon one or more machine learning algorithms 804. The machine learning algorithm(s) 804 can be any existing, well-known algorithm, any proprietary algorithms, or any future machine learning algorithm. Some example machine learning algorithms 804 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 804 based upon the problem(s) to be solved by machine learning via the machine learning system 800.

The machine learning system 800 can control the creation of the machine learning models 802 via one or more training parameters. In some embodiments, the training parameters are selected modelers at the direction of an enterprise, for example. Alternatively, in some embodiments, the training parameters are automatically selected based upon data provided in one or more training data sets 806. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 804 converges to the optimal weights. The machine learning algorithm 804 can update the weights for every data example included in the training data set 806. The size of an update is controlled by the learning rate. A learning rate that is too high might prevent the machine learning algorithm 804 from converging to the optimal weights. A learning rate that is too low might result in the machine learning algorithm 804 requiring multiple training passes to converge to the optimal weights.

The model size is regulated by the number of input features ("features") 808 in the training data set 806. A greater the number of features 808 yields a greater number of possible patterns that can be determined from the training data set 806. The model size should be selected to balance the resources (e.g., compute, memory, storage, etc.) needed for training and the predictive power of the resultant machine learning model 802.

The number of training passes indicates the number of training passes that the machine learning algorithm 804 makes over the training data set 806 during the training process. The number of training passes can be adjusted based, for example, on the size of the training data set 806, with larger training data sets being exposed to fewer training passes in consideration of time and/or resource utilization. The effectiveness of the resultant machine learning model 802 can be increased by multiple training passes.

Data shuffling is a training parameter designed to prevent the machine learning algorithm 804 from reaching false optimal weights due to the order in which data contained in the training data set 806 is processed. For example, data provided in rows and columns might be analyzed first row, second row, third row, etc., and thus an optimal weight might be obtained well before a full range of data has been considered. By data shuffling, the data contained in the training data set 806 can be analyzed more thoroughly and mitigate bias in the resultant machine learning model 802.

Regularization is a training parameter that helps to prevent the machine learning model 802 from memorizing training data from the training data set 806. In other words, the machine learning model 802 fits the training data set 806, but the predictive performance of the machine learning model 802 is not acceptable. Regularization helps the machine learning system 800 avoid this overfitting/memorization problem by adjusting extreme weight values of the features 808. For example, a feature that has a small weight value relative to the weight values of the other features in the training data set 806 can be adjusted to zero.

The machine learning system 800 can determine model accuracy after training by using one or more evaluation data sets 810 containing the same features 808' as the features 808 in the training data set 806. This also prevents the machine learning model 802 from simply memorizing the data contained in the training data set 806. The number of evaluation passes made by the machine learning system 800 can be regulated by a target model accuracy that, when reached, ends the evaluation process and the machine learning model 802 is considered ready for deployment.

After deployment, the machine learning model 802 can perform a prediction operation ("prediction") 814 with an input data set 812 having the same features 808" as the features 808 in the training data set 806 and the features 808' of the evaluation data set 810. The results of the prediction 814 are included in an output data set 816 consisting of predicted data. The machine learning model 802 can perform other operations, such as regression, classification, and others. As such, the example illustrated in FIG. 8 should not be construed as being limiting in any way.

Based on the foregoing, it should be appreciated that concepts and technologies directed to data transport compression and reduction based upon intra-content user focus have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   determining, by a device comprising a processor, an intra-content focus area of a user viewing a display;
   providing, by the device, the intra-content focus area to a content server;
   receiving, by the device, from the content server, a content portion associated with the intra-content focus area, wherein the content portion associated with the intra-content focus area comprises a composite user stream, wherein the composite user stream comprises a combination of at least three streams of the content portion, and wherein each of the at least three streams of the content portion has at least one of a lower resolution, lower color, or lower refresh rate than a base stream of the content portion; and
   presenting, by the device, via the display, the content portion.

2. The method of claim 1, wherein determining, by the device, the intra-content focus area of the user viewing the display comprises tracking a head movement of the user.

3. The method of claim 2, wherein determining, by the device, the intra-content focus area of the user viewing the display further comprises tracking an eye movement of an eye of the user.

4. The method of claim 3, wherein determining, by the device, the intra-content focus area of the user viewing the display further comprises determining a field-of-view center of the eye of the user.

5. The method of claim 4, wherein the content portion comprises data within the field-of-view center of the eye of the user.

6. The method of claim 5, wherein the content portion comprises additional data outside the field-of-view center of the eye of the user.

7. The method of claim 6, wherein the data within the field-of-view center of the eye of the user is rendered in a higher resolution than the additional data outside the field-of-view center of the eye of the user, a higher percentage of a color space than the additional data outside the field-of-view center of the eye of the user, or a higher refresh rate than the additional data outside the field-of-view center of the eye of the user.

8. The method of claim 1, wherein the composite user stream is sent to a plurality of devices comprising the device, thereby saving bandwidth during transmission of the content portion.

9. The method of claim 1, wherein the base stream comprises a full resolution value, a full color value, and a full refresh rate value.

10. A device comprising:
a processor; and
a memory comprising instructions that, when executed by the processor, cause the processor to perform operations comprising
determining an intra-content focus area of a user viewing a display,
providing the intra-content focus area to a content server,
receiving, from the content server, a content portion associated with the intra-content focus area, wherein the content portion associated with the intra-content focus area comprises a composite user stream, wherein the composite user stream comprises a combination of at least three streams of the content portion, and wherein each of the at least three streams of the content portion has at least one of a lower resolution, lower color, or lower refresh rate than a base stream of the content portion, and
presenting, via the display, the content portion.

11. The device of claim 10, wherein determining the intra-content focus area of the user viewing the display comprises:
tracking a head movement of the user;
tracking an eye movement of an eye of the user; and
determining a field-of-view center of the eye of the user.

12. The device of claim 11, wherein the content portion comprises data within the field-of-view center of the eye of the user and additional data outside the field-of-view center of the eye of the user.

13. The device of claim 12, wherein the data within the field-of-view center of the eye of the user is rendered in a higher resolution than the additional data outside the field-of-view center of the eye of the user.

14. The device of claim 12, wherein the data within the field-of-view center of the eye of the user is rendered in a higher percentage of a color space than the additional data outside the field-of-view center of the eye of the user.

15. The device of claim 12, wherein the data within the field-of-view center of the eye of the user is presented in a higher refresh rate than the additional data outside the field-of-view center of the eye of the user.

16. The device of claim 10, further comprising the display.

17. The device of claim 16, wherein the display comprises an extended reality display, and wherein the content portion comprises immersive content.

18. A computer-readable storage medium having instructions stored thereon that, when executed by a device, cause the device to perform operations comprising:
determining an intra-content focus area of a user viewing a display;
providing the intra-content focus area to a content server;
receiving, from the content server, a content portion associated with the intra-content focus area, wherein the content portion associated with the intra-content focus area comprises a composite user stream, and wherein the composite user stream comprises a combination of at least three streams of the content portion, wherein each of the at least three streams of the content portion has at least one of a lower resolution, lower color, or lower refresh rate than a base stream of the content portion; and
presenting, via the display, the content portion.

19. The computer-readable storage medium of claim 18, wherein determining the intra-content focus area of the user viewing the display comprises:
tracking a head movement of the user;
tracking an eye movement of an eye of the user; and
determining a field-of-view center of the eye of the user.

20. The computer-readable storage medium of claim 19, wherein the content portion comprises data within the field-of-view center of the eye of the user and additional data outside the field-of-view center of the eye of the user; wherein the data within the field-of-view center of the eye of the user is rendered in a higher resolution than the additional data outside the field-of-view center of the eye of the user; wherein the data within the field-of-view center of the eye of the user is rendered in a higher percentage of a color space than the additional data outside the field-of-view center of the eye of the user; and wherein the data within the field-of-view center of the eye of the user is rendered in a higher refresh rate than the additional data outside the field-of-view center of the eye of the user.

* * * * *